United States Patent
Roeker et al.

(10) Patent No.: US 6,506,277 B2
(45) Date of Patent: Jan. 14, 2003

(54) ABRASIVE SHEET DISPENSER AND METHOD OF USE

(75) Inventors: David C. Roeker, Hudson, WI (US); Jerome M. Fried, North St. Paul, MN (US); Frederick A. Magadanz, Scandia, MN (US); John Telischak, Jr., Apple Valley, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 133 days.

(21) Appl. No.: 09/738,496

(22) Filed: Dec. 15, 2000

(65) Prior Publication Data

US 2001/0000643 A1 May 3, 2001

Related U.S. Application Data

(62) Division of application No. 09/097,420, filed on Jun. 15, 1998, now Pat. No. 6,193,337.

(51) Int. Cl.[7] .............................................. B32B 31/00
(52) U.S. Cl. ...................... 156/299; 428/78; 451/537; 451/539; 221/312 C; 269/287
(58) Field of Search ................................ 156/297, 299, 156/301, 302, 542, 552, 554, 556, 558, 559, 563, 564, 565; 428/78, 100; 451/533, 537, 539; 15/230.12; 221/312 C; 269/287

(56) References Cited

U.S. PATENT DOCUMENTS

| 2,274,238 A | 2/1942 | Henderson, III et al. |
| 3,413,668 A | 12/1968 | Bak et al. |
| 3,849,949 A | 11/1974 | Steinhauser et al. |
| 4,432,451 A | 2/1984 | Hooser |
| 4,474,294 A | 10/1984 | Koppelmans |
| 4,551,902 A | 11/1985 | Thibaut |
| 4,609,581 A | 9/1986 | Ott |
| 4,712,289 A | 12/1987 | Stamm et al. |
| 4,875,259 A | 10/1989 | Appeldorn |
| 4,920,702 A | 5/1990 | Kloss et al. |
| 5,201,101 A | 4/1993 | Rouser et al. |
| 5,377,455 A | 1/1995 | Lanzer |
| 5,482,496 A | 1/1996 | Lanzer |
| 5,607,345 A | 3/1997 | Barry et al. |
| 5,672,186 A | 9/1997 | Chesley et al. |
| 5,692,949 A | 12/1997 | Sheffield et al. |

FOREIGN PATENT DOCUMENTS

| DE | 35 11 088 A1 | 6/1986 |
| FR | 2 636 591 | 3/1990 |
| WO | WO 96/38264 | 12/1996 |

OTHER PUBLICATIONS

U.S. Design Application Ser. No. 29/089,364, filed Jun. 15, 1998, now Patent No. D415378, issued Oct. 1999.

Primary Examiner—Michael W. Ball
Assistant Examiner—Jessica Rossi
(74) Attorney, Agent, or Firm—Gregory D. Allen

(57) ABSTRACT

A dispenser and method for attaching abrasive sheets to a backup pad. The dispenser conveniently centers on the backup pad an abrasive sheet that is larger than the backup pad. In a preferred embodiment, the dispenser comprises: a holder configured to receive circular abrasive sheets, the holder including a bottom, a top, front portion and a rear portion, wherein the rear portion extends farther from the bottom than the front portion, and wherein the bottom of the holder defines at least a 180 degree arc of a first circle having a first radius; a slider guide extending along the rear of the holder; and a spacer mounted in the guide, wherein the spacer is movable along the guide from a first position within the front portion of the holder to a second position beyond the front portion of the holder, the spacer defining an arc of no more than 180 degrees of a second circle having a second radius smaller than the first radius.

4 Claims, 8 Drawing Sheets

ABRASIVE SHEET DISPENSER AND METHOD OF USE

This is a divisional of Application Ser. No. 09/097,420 filed Jun. 15, 1998, now U.S. Pat. No. 6,193, 337.

TECHNICAL FIELD

The present invention relates generally to a dispenser for attaching abrasive sheets to a backup pad, and more particularly to a dispenser that conveniently centers on the backup pad an abrasive sheet that is larger than the backup pad.

BACKGROUND OF THE INVENTION

Abrasives are commonly used to grind, sand, and polish materials such as wood, metal, paint, and plastic. One method of abrading a workpiece is to affix an abrasive sheet to a backup pad, and to rotate the backup pad while urging the abrasive against a workpiece. In many applications, the abrasive sheet and the backup pad are circular, although other configurations are also known. For example, U.S. Pat. No. 4,920,702 (Kloss et al.) discloses a portable grinder having, in one embodiment, a generally triangular backup pad and abrasive sheet that are vibrated rather than rotated.

The abrasive sheet may be affixed to the backup pad in a number of different ways. For example, the use of a pressure sensitive adhesive (see, e.g., U.S. Pat. No. 3,849,949 (Steinhauser et al.)), interengaging fastener members, such as hook portions on the backup pad and loop fabric on the abrasive sheet (see, e.g., U.S. Pat. No. 4,609,581 (Ott)), loop fabric on the backup pad and hooks on the abrasive article (see, e.g., U.S. Pat. No. 5,672,186 (Chesley et al) and U.S. Pat. No. 5,692,949 (Sheffield et al)), intermeshing fasteners (see, e.g., U.S. Pat. No. 4,875,259 (Appeldorn) or U.S. Pat. No. 5,201,101 (Rouser et al.)), and cooperating male and female fastener members, are known in the art.

The backup pad may be configured to be hand held, or may be configured for attachment to a powered abrading apparatus. A typical abrading apparatus includes a rotating output shaft that is powered by an abrading head. These abrading apparatuses, alternatively referred to as grinders herein, may be electrically or pneumatically powered, and typically rotate the backup pad at speeds between 3,000 and 20,000 revolutions per minute. The abrading apparatus may be one of several types. For example, a rotary grinder simply rotates the backup pad and attached abrasive sheet about a fixed axis. A random orbital grinder combines a rotary and orbital motion that results in a random motion of the backup pad with respect to the abrading head.

The diameter of the abrasive sheet is typically larger than the diameter of the backup pad (for example, a 127 mm sheet and a 124 mm pad), to permit abrading near the periphery of the abrasive sheet without damage to the backup pad or to the surface being abraded. It is desirable to position the abrasive sheet relative to the backup pad so that the sheet extends beyond the backup pad around its entire circumference without any of the support surface of the backup pad exposed. It is also desirable to center the abrasive sheet relative to the backup pad so that the amount by which the sheet extends beyond the backup pad is relatively constant along the periphery of the sheet. Typically, the operator of the apparatus applies the abrasive sheet by hand while attempting to center it as well as possible. It is also known to program robotic sanders to attach abrasive sheets centered on the backup pad (see U.S. Pat. No. 5,377,455 (Lanzer)).

Various dispensers for abrasive articles are known, such as those disclosed in U.S. Pat. No. 3,849,949 (Steinhauser et al.) or WIPO International Patent Application Publication No. W096/38264 (King et al.). However, these dispensers do not provide a convenient way to center an abrasive sheet on a backup pad.

It is desirable to provide an abrasive sheet dispenser that simply and effectively centers an abrasive sheet on a backup pad.

SUMMARY OF THE INVENTION

One aspect of the present invention provides an abrasive sheet dispenser. The dispenser comprises a holder configured to receive a plurality of abrasive sheets and a spacer. The holder includes a holder inner periphery; a slider guide extending along the holder; and a spacer mounted to the slider guide. The spacer is movable along the slider guide from a first position to a second position and includes an inner surface defining a spacer periphery at a distance from the holder periphery.

In one preferred embodiment of the above dispenser, the holder inner periphery has a first radius of curvature, and the spacer periphery has a second radius of curvature smaller than the first radius of curvature. Preferably, the holder inner periphery is concentric with the spacer periphery.

In another preferred embodiment of the above dispenser, the holder inner periphery forms at least an arc of a first circle having a first radius, and the spacer periphery forms at least an arc of a second circle having a second radius smaller than the first radius. Preferably, the arc of the first circle is concentric with the arc of the second circle. In this embodiment, it is also preferred that the holder inner periphery forms at least a 180 degree arc of a circle. Optionally, the holder inner periphery defines a complete circle. In another preferred embodiment, the spacer periphery defines an arc of no more than 180 degrees.

In another preferred embodiment of the above dispenser, the slider guide comprises an elongate slot extending through the rear portion of the holder.

In another preferred embodiment of the above dispenser, the holder comprises a top and a bottom, and the slider guide extends in the direction between the bottom of the holder and the top of the holder.

In another preferred embodiment of the above dispenser, the holder has a front portion and a rear portion. The slider guide is located in the rear portion, the first position of the holder is within the front portion of the holder, and the second position is beyond the front portion of the holder.

In another preferred embodiment, the above dispenser also includes a base. The holder extends from the base, the slider guide is perpendicular to the base, and the first position of the spacer is closer to the base than the second position of the spacer. In one aspect of this embodiment, the dispenser comprises a unitary molded plastic base and holder.

In another preferred embodiment, the spacer includes a foot extending therefrom. The foot is sized and configured to help hold down the stack of abrasive sheets, and is particularly useful with thin spacers.

Another aspect of the present invention provides a dispenser for circular abrasive sheets. The dispenser comprises a holder configured to receive circular abrasive sheets, the holder including a bottom, a top, front portion and a rear portion, in which the rear portion extends farther from the bottom than the front portion, and in which the bottom of the holder defines at least a 180 degree arc of a first circle having a first radius; a slider guide extending along at least a portion of the rear of the holder in the direction between the top and bottom of the holder; a spacer mounted in the slider guide, the spacer is movable along the slider guide from a first portion within the front portion of the holder to a second position beyond the front portion of the holder, the spacer defining an arc of no more than 180 degrees of a second circle having a second radius smaller than the first radius. In one preferred embodiment, the arcs of the first and second circles are concentric.

In yet another aspect, the present invention provides a method of attaching an abrasive sheet to a support surface of a backup pad, in which the abrasive sheet is larger than the support surface, and the abrasive sheet includes an attachment surface for attachment to the support surface. The method comprises the steps of a) providing the abrasive sheet in a holder of a dispenser such that the attachment surface of the abrasive sheet is exposed, the holder being sized and configured to closely conform to the periphery of the abrasive sheet, the dispenser also includes a spacer within the holder that is sized and configured to closely conform to the periphery of the backup pad; b) contacting the periphery of the backup pad against the spacer to thereby orient the backup pad relative to the abrasive sheet such that the periphery of the abrasive sheet extends beyond the periphery of the support surface of the backup; c) while the backup pad is so oriented, contacting the backup pad against the attachment surface of the abrasive sheet so as to attach the abrasive sheet to the backup pad; and d) removing the backup pad and attached abrasive sheet from the holder. In one preferred embodiment, the backup pad and abrasive sheet are circular, and step b) further includes orienting the support surface of the backup pad such that it is concentric with the abrasive sheet. In another preferred embodiment, step a) further comprises placing a plurality of abrasive sheets into the holder and moving the spacer to contact the top abrasive sheet. This method can include the further step subsequent to step d) of e) moving the spacer towards the plurality of abrasive sheets so as to contact the next adjacent abrasive sheet.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

Figure 1:
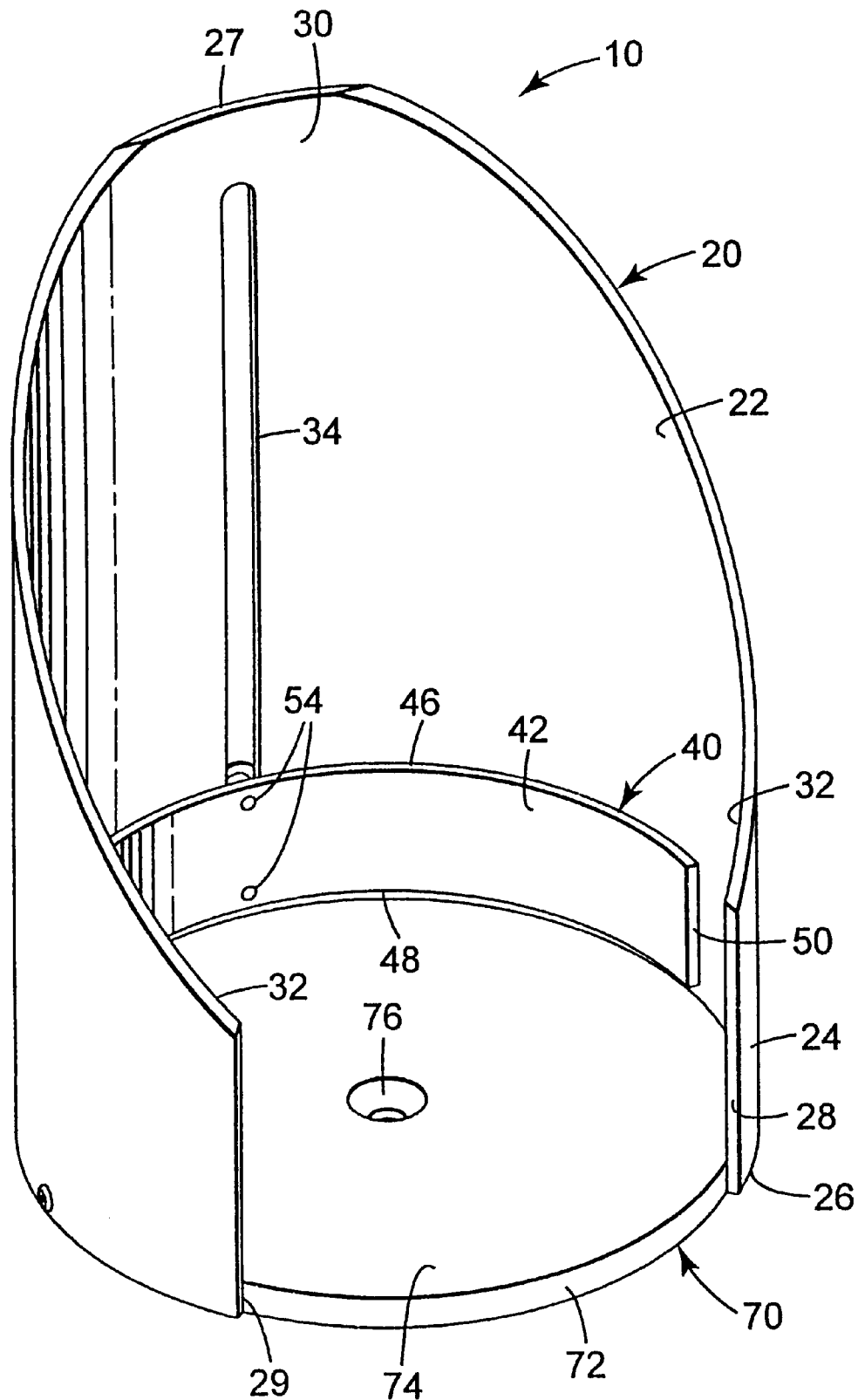
FIG. 1 is an isometric view of a preferred embodiment of a dispenser according to the present invention.

Referring to FIG. 1, there is shown therein a first preferred embodiment of a dispenser 10 according to the present invention. Dispenser 10 is designed to hold a plurality of abrasive sheets for attachment to a backup pad. The dispenser is configured to allow for convenient, one-handed operation. It is also configured to position the backup pad relative to the abrasive sheets such that the abrasive sheets, which have a larger area than the backup pad, extend beyond the periphery of the backup pad. In other words, the abrasive sheets are positioned so that there is no exposed area of the surface of the backup pad at its periphery that is not covered by the abrasive sheet. It is preferred, but not required, that the abrasive sheet is generally centered on the backup pad such that the amount the sheet extends beyond the backup pad around the periphery is generally constant and uniform.

The dispenser 10 includes a holder 20, spacer 40, and optional base 70. The holder 20 extends from the base 70, and can be attached thereto by any suitable means such as bolts, screws, brazing, welding. Alternatively, the holder 20 and base 70 may be molded such as by injection molding or blow molding a unitary base and holder out of plastic. The holder 20 and base 70 may be constructed of any suitable material such as metal or plastic.

Figure 2:
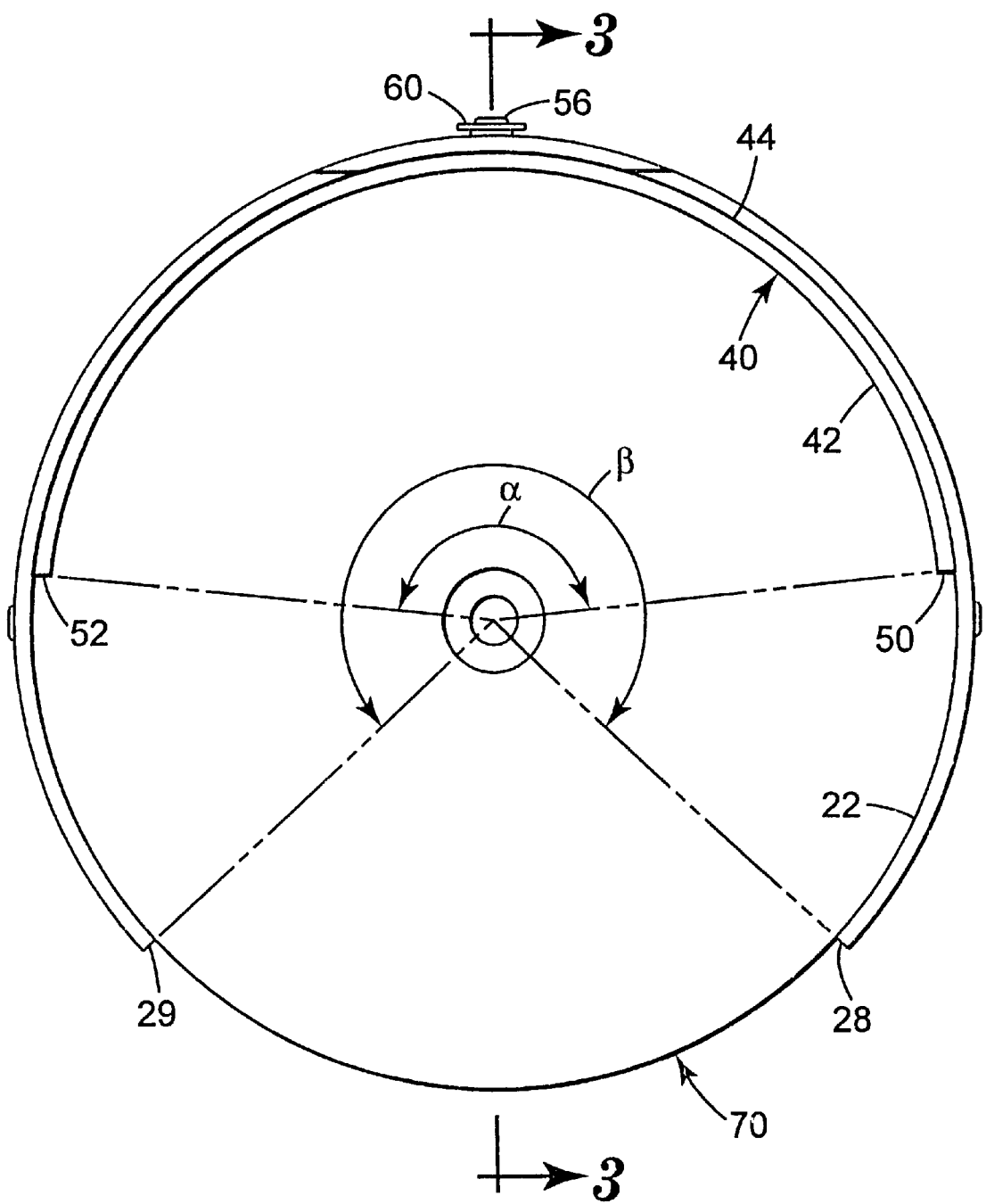
FIG. 2 is a top view of the dispenser of FIG. 1.
Figure 9:
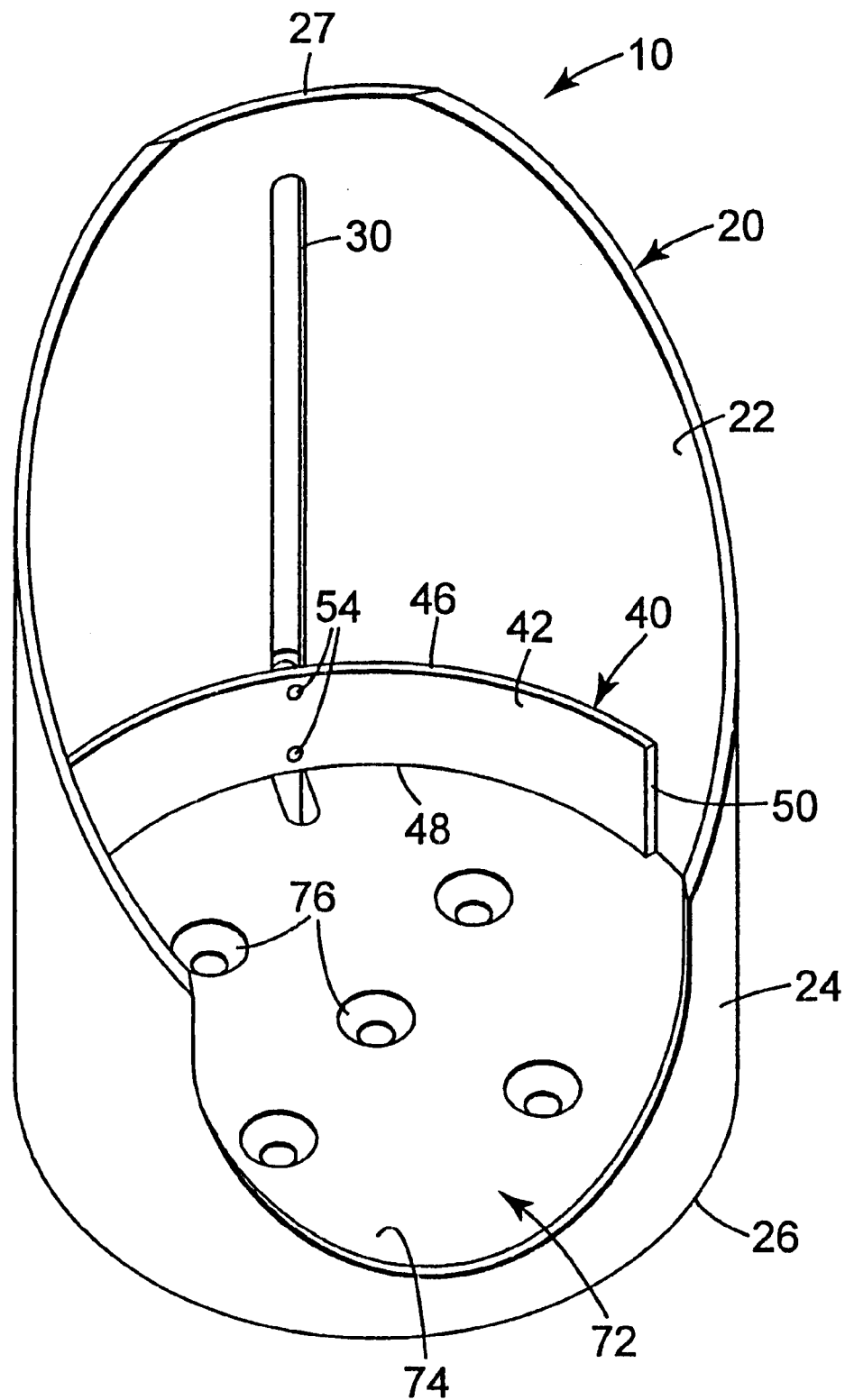
FIG. 9 is an isometric view of another preferred embodiment of a dispenser according to the present invention.

The holder is configured to closely match the size and shape of the abrasive sheets to be held therein. In the embodiment illustrated in FIGS. 1 and 2, holder 20 is configured to receive circular abrasive sheets. Therefore, as best seen in FIG. 2, the inside surface 22 of holder 20 defines an arc of a circle. Holder 20 includes bottom 26 adjacent the base 70 and top 27 opposite the base. Holder 20 also includes a rear portion 30 and front portion 32. Preferably, rear portion 30 extends farther from the bottom 26 of the holder than does the front portion 32. In the illustrated embodiment, the holder 20 does not form a complete circle at bottom 26, but instead has an opening in the front bounded by first end 28 and second end 29. Optionally, the bottom 26 of the holder can form a complete circle at bottom 26. Base 70 includes a top surface 74 for receiving the abrasive sheets. Base 70 has an outer periphery 72 to which the holder 20 is affixed. Base 70 also includes a countersunk hole 76 that can be used to mount the dispenser 10 to a table, workbench, or the like. Base 70 may include a plurality of attachment holes as illustrated in the embodiment of FIG. 9. Mounting the dispenser may be advantageous when the dispenser is light weight, such as when it is constructed of plastic. In such a case, it may be desirable to attached the dispenser to a table or workbench, or to a heavier, portable base. For example, a single dispenser or any number of dispensers (such as for different sized abrasive sheets) may be attached to a single heavier base. This heavier base may be stationary or fixed.

Returning to FIGS. 1 and 2, mounted to the holder 20 is spacer 40. Spacer 40 includes an inside surface 42 facing the center of the holder 20 and an outside surface 44 facing the inside surface 22 of the holder 20. The inside surface 42 of the spacer is sized and configured to closely match the contour of the backup pad intended to be used with the dispenser 10. Spacer 40 also includes a bottom 48 that will rest against the abrasive sheets held in the dispenser, and a top 46 opposite the bottom. In the illustrated embodiment, the spacer inner surface 42 forms an arc of a circle to match the outer periphery of a circular backup pad. As best seen in FIG. 2, the thickness between the inside and outside surfaces 42, 44 of the spacer 40 will keep the backup pad that distance from the inside surface 22 of the holder 20.

The spacer 40 is movably mounted in the slider guide 34 that extends along the rear 30 of the holder 20. In the illustrated embodiment, the slider guide 34 comprises an elongate slot through the rear portion 30 of the holder 20.

Figure 3:
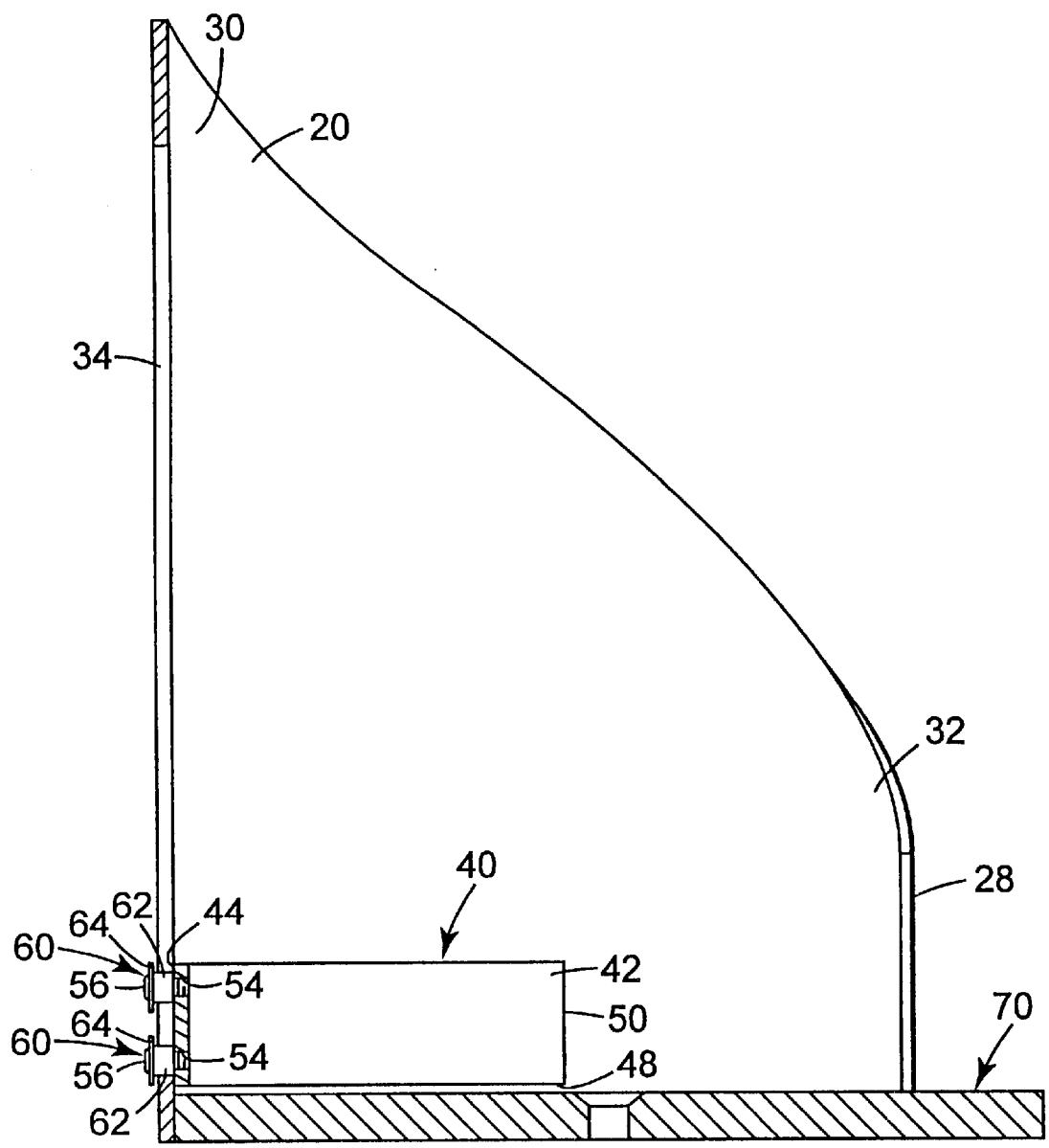
FIG. 3 is a cross-sectional view of the dispenser taken along line 3—3 of FIG. 2.

The slider guide 34 extends in the direction between the bottom 26 and top 27 of the spacer. Preferably, the slider guide 34 does not extend completely to the top and bottom, but it optionally may extend all of the way to either or both of the top and bottom. As seen in FIG. 3, screws 56 extend through fitting 60. Fitting 60 includes a shaft 62 that extends through the guide 34 and a flange portion 64 that is sized so as not to fit through the guide 34. Screws 56 extend through the fitting 60 and are in threaded engagement with the threaded holes 54 in the spacer 40. In this manner, the spacer 40 can slide along the guide 34.

Figure 4:
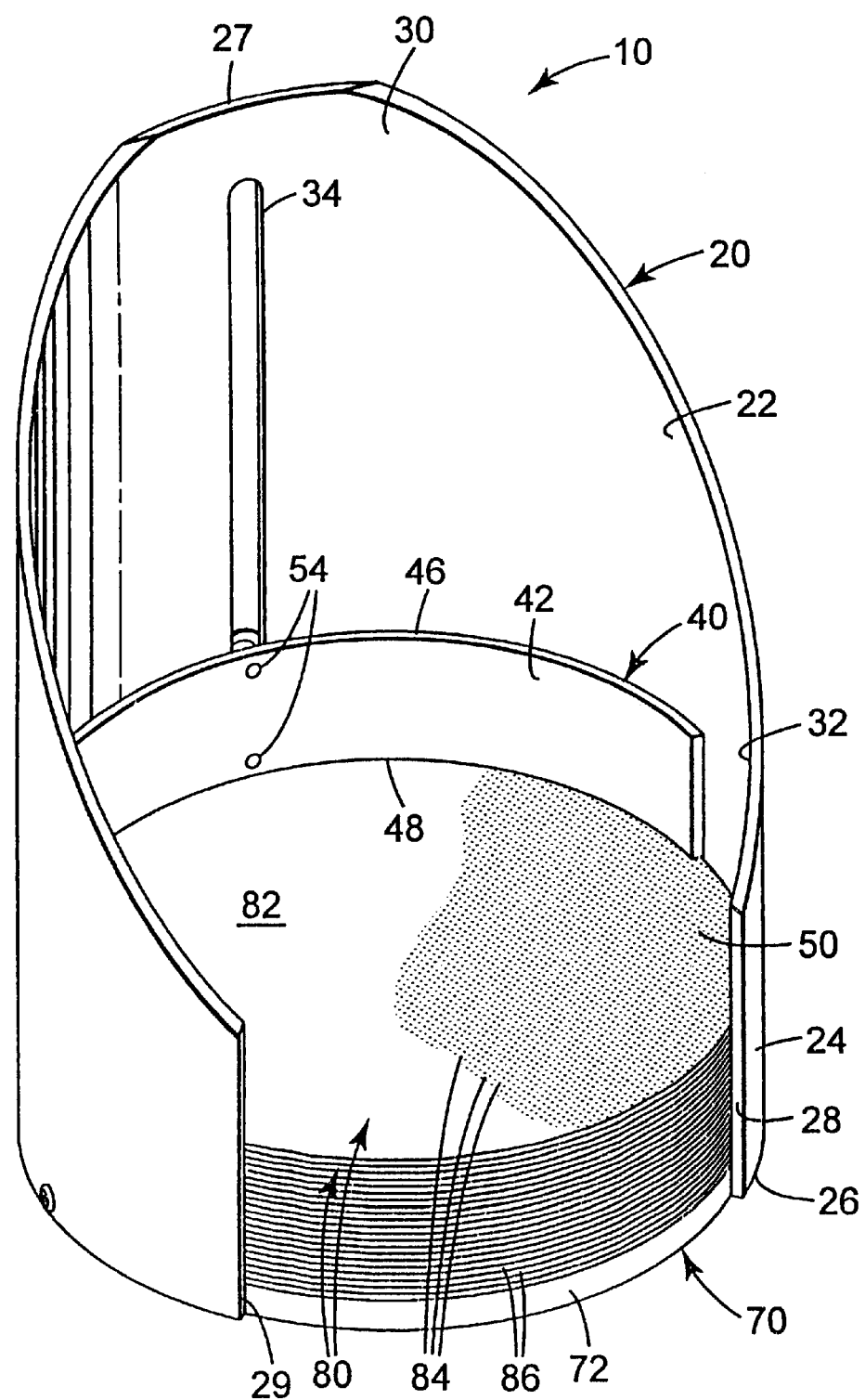
FIG. 4 is an isometric view of the dispenser of FIG. 1 with a plurality of abrasive sheets held therein.
Figure 5:
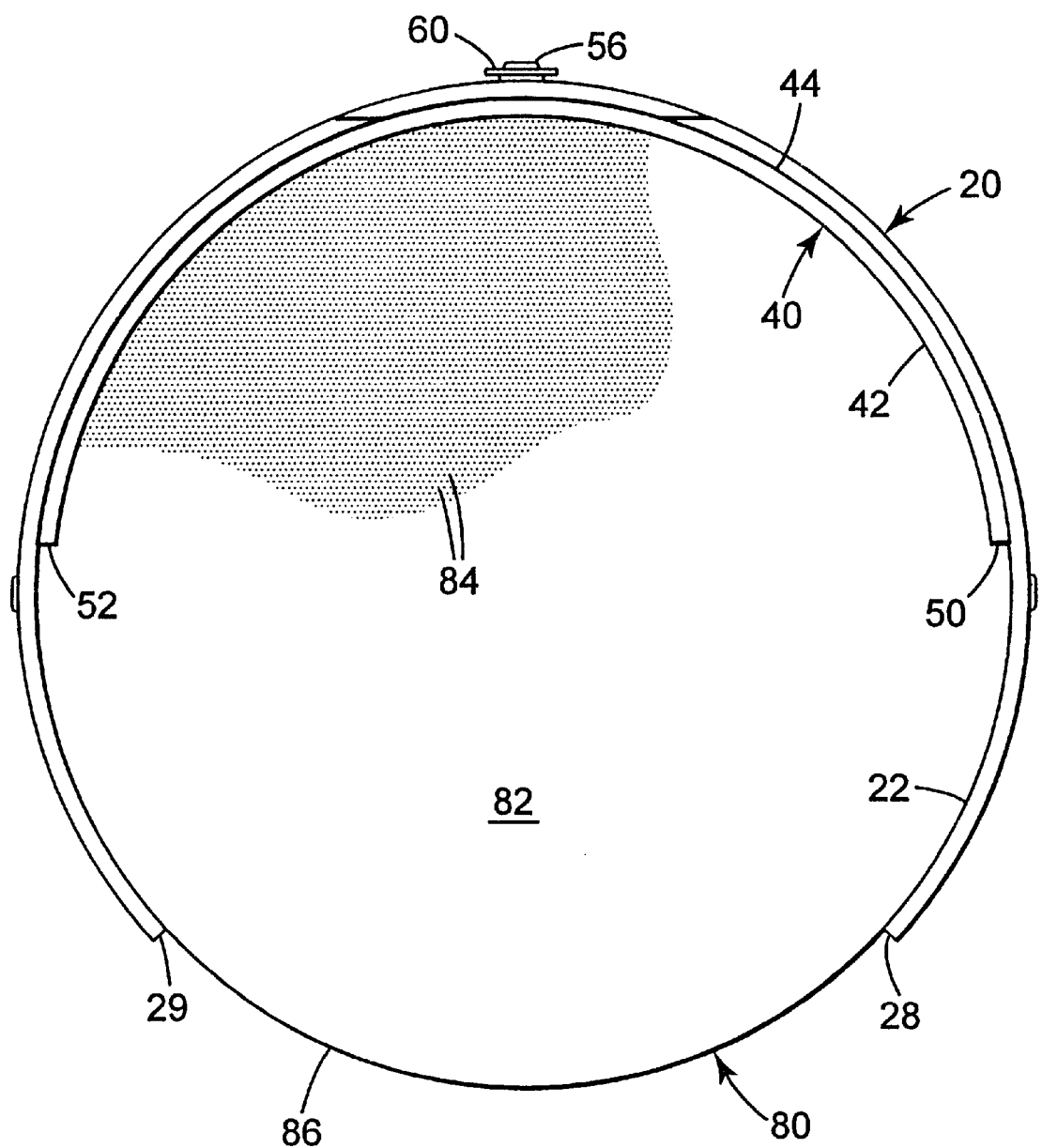
FIG. 5 is a top view of the dispenser and abrasive sheets of FIG. 4.

FIG. 4 illustrates the dispenser 20 of FIGS. 1–3 with a plurality of abrasive sheets 80 held therein. In the illustrated embodiment, the abrasive sheets are circular, with outer periphery 86 closely fitting against the inner surface 22 of the holder 20. The abrasive sheets are placed with the abrasive surface facing towards the top surface 74 of the base 70 and with back surface 82 of the uppermost abrasive sheet 80 exposed. In this manner, the exposed back surface 82 is positioned for attachment to the support surface of the backup pad. Abrasive sheets 82 include any suitable attachment surface 84. In the illustrated embodiment, attachment surface 84 includes a plurality of headed hooking stems for engagement with a loop material on the support surface of the backup pad. Abrasive sheets 80 are placed in the holder 20 by raising the spacer 40 away from the bottom 26 of the holder towards the top 27 of the holder, placing a desired number of abrasive sheets into the holder, and releasing the spacer 40 to allow the bottom 48 of the spacer to come into contact with the exposed attachment surface 84 of the uppermost abrasive sheet 80. As seen in FIG. 5, the outer periphery 86 of the abrasive sheets closely conforms to the inner surface 22 of the holder 20. It is also seen that the holder 40 overlaps a portion of an annulus adjacent the outer periphery of the abrasive sheet.

Figure 6:
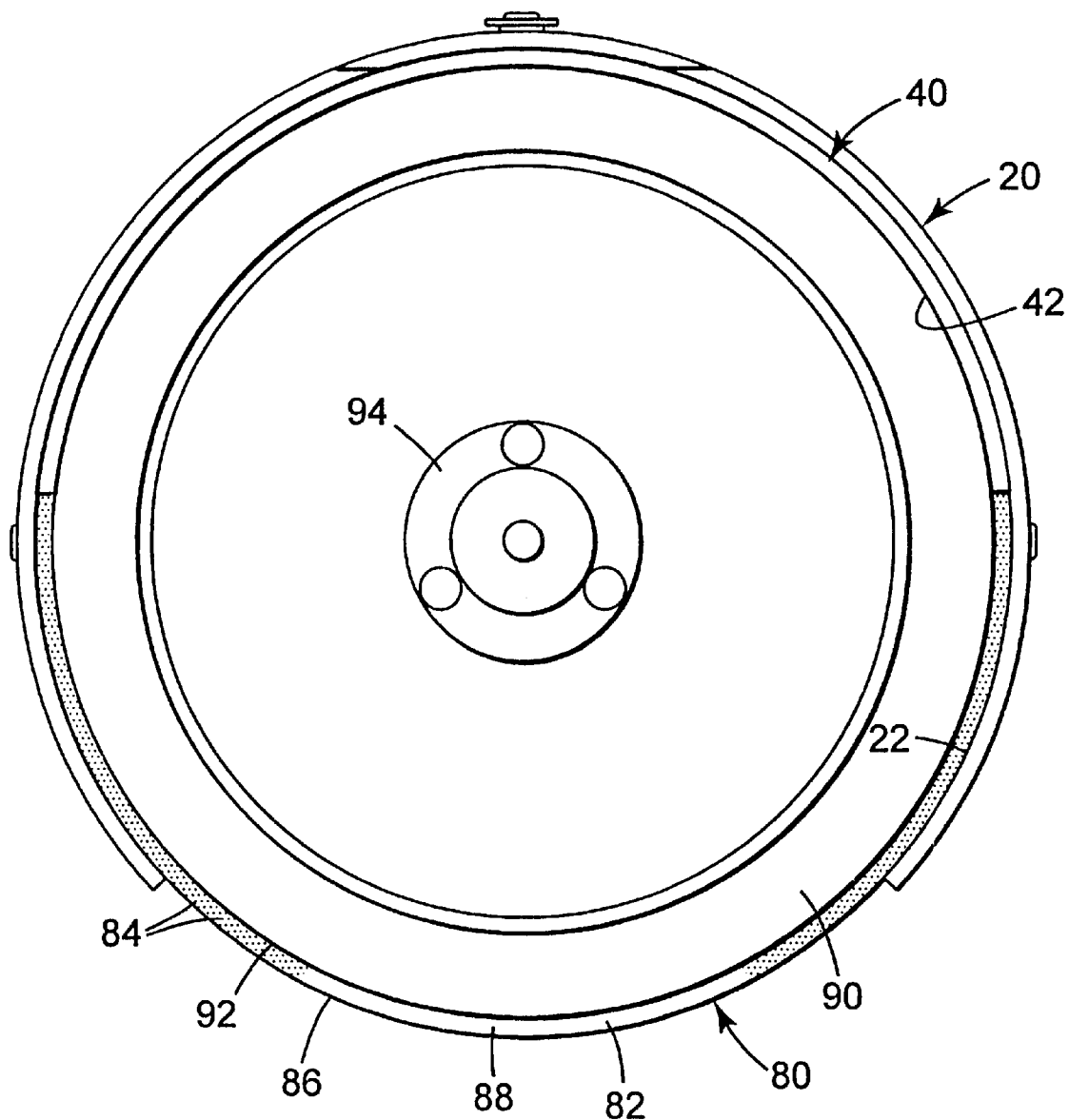
FIG. 6 is a view like FIG. 5, showing a backup pad placed in the dispenser to receive an abrasive sheet.

FIG. 6 is a top view of the dispenser 10 and abrasive sheets 80 illustrated in FIGS. 4 and 5, with a backup pad 90 placed in the holder 20 for attachment to the top abrasive sheet. In the illustrated embodiment, backup pad 90 includes a circular outer periphery 92. Backup pad 90 also includes mounting means 94 for attaching the backup pad to any suitable drive means. Opposite the drive means, the backup pad includes a support surface for holding an abrasive sheet. The area of the support surface of the backup pad is somewhat smaller than the area of the abrasive sheet 80. Preferably, the dispenser 10 orients the backup pad and abrasive sheet such that none of the support surface of the backup pad at its periphery is left exposed when the abrasive sheet is attached. More preferably, the abrasive sheet extends beyond the backup pad around the entire peripheries of the backup pad and abrasive sheet. Most preferably, the abrasive sheet and backup pad are centered such that the amount the abrasive sheet extends beyond the backup pad is generally constant around the entire periphery. In the illustrated embodiment, the back surface 82 of the abrasive sheet has an outer annular portion 88 that extends beyond the backup pad around the entire periphery. This annular portion is obtained by sizing the thickness of the spacer 40 to be equal to the difference in the radius of the abrasive sheet compared to the radius of the backup pad, and by making the inner surface 42 of the spacer concentric with the inner surface 22 of the holder. Thus, the inner surface 42 of the spacer forms an arc of a circle that has a smaller radius than the arc of the circle defined by the inner surface 22 of the holder. Stated another way, the radius of curvature of the inner surface 42 of the spacer is smaller than the radius of curvature of the inner surface 22 of the holder. Preferably, the inner surface 42 of the spacer is concentric with the inner surface 22 of the holder.

The abrasive sheet 80 may be affixed to the backup pad in any suitable manner. Examples of suitable attachment systems include pressure sensitive adhesive (see, e.g., U.S. Pat. No. 3,849,949 to Steinhauser et al.), interengaging fastener members, such as hook portions on the backup pad and loop fabric on the abrasive sheet (see, e.g., U.S. Pat. No. 4,609,581 to Ott), loop fabric on the backup pad and hooks on the abrasive article (see, e.g., U.S. Pat. Nos. 5,672,186 to Chesley et al., 5,607,345 to Barry et al., and 5,692,949 to Sheffield et al.), intermeshing fasteners (see, e.g., U.S. Pat. Nos. 4,875,259 to Appeldorn and 5,201,101 to Rouser et al.), and cooperating male and female fastener members. Abrasive sheets and backup pads are well known in the art and need not be described in any greater detail herein. Furthermore, although the use of the dispenser is described with respect to abrasive sheets, the dispenser may be used with any type of abrasive article to be attached to a backup pad. Therefore, the term "abrasive sheet" as used herein including the claims, refers to any abrasive article to be attached to a backup pad.

To mount an abrasive sheet on the backup pad, a user places the backup pad within the holder 20, and contacts the outer periphery 92 of the backup pad against the inner surface 42 of the spacer. This will orient properly the backup pad relative to the abrasive sheets. The backup pad is then lowered such that the support surface of the backup pad contacts the exposed surface 82 of the abrasive sheet 80. The attachment surface 84 of the abrasive sheet will then attach to the support surface of the backup pad 90. The user then withdraws the backup pad from the holder with the top abrasive sheet attached to the support surface of the backup pad. The slidably mounted spacer 40 will then drop lower and come into contact with the newly exposed abrasive sheet at the top of the stack. The spacer 40 is preferably of a size and weight sufficient to hold down the stack of sheets and to help keep flat the abrasive sheets which may have a tendency to curl. Therefore, the spacer is preferably made of a heavy material such as brass, steel, zinc, or cast iron.

Preferably, the rear portion 30 of the holder 20 extends farther from the bottom 26 than does the front portion 32. In this way, the abrasive sheets 80 and the backup pad 90 can be conveniently placed into the holder 20 over the lower front portion. The taller rear portion 30 allows the guide 34 to extend beyond the height of the front portion. This allows the spacer 40 to be raised along the guide to a position outside of the front portion of the holder. With the spacer 40 in this raised position, the abrasive sheets may be easily placed in the holder 20 with the spacer out of the way.

As seen in the preferred embodiment illustrated in FIG. 2, the bottom 26 of the holder 20 forms a circular arc. Preferably, the angular size β of the bottom of the holder 20 is at least 180 degrees to securely hold the abrasive sheets therein and minimize the chance of the sheets inadvertently slipping out of the front of the holder. Angle β may be as large as 360 degrees. That is, the bottom of the holder may form a complete circle, as illustrated in the alternate embodiment of FIG. 9. Returning to FIG. 2, it is preferred that the angular size a of the spacer 40 be no greater than 180 degrees. This makes it easier to bring the periphery 92 of the backup pad in contact with the inner surface 42 of the spacer.

Figure 7:
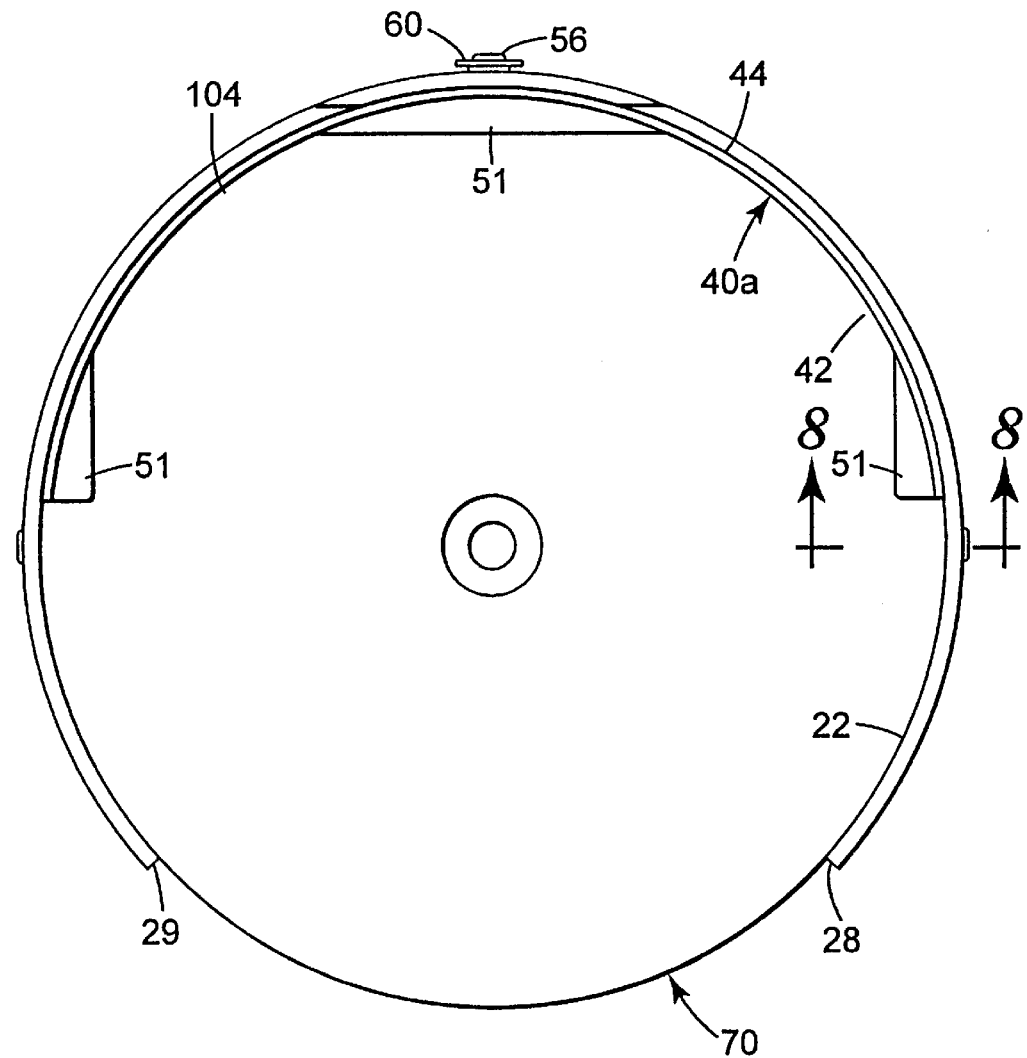
FIG. 7 is a top view of a second preferred embodiment of a dispenser according to the present invention.
Figure 8:
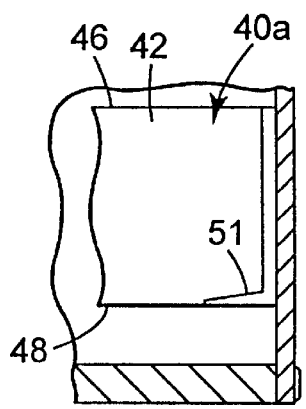
FIG. 8 is a cross-sectional view taken along line 8—8 of FIG. 7.

An alternate embodiment of the spacer 40 is illustrated in FIGS. 7 and 8. In this embodiment, spacer 40a is similar to the spacer 40 as described above, with the addition of feet 51. Feet 51 extend from the bottom 48 of the spacer in the direction towards the center of the holder. In the illustrated embodiment, the thickness of the spacer between the inside surface 42 and outside surface 44 is somewhat thinner than in the embodiment illustrated in FIGS. 1–6. This is preferable when there is a smaller difference in the size of the support surface of the backup pad and the periphery of the abrasive sheet. The thinner spacer will center the backup pad and abrasive sheet relative to one another. Such a thin spacer, however, may not adequately hold down the stack of abrasive sheets. Feet 51 extend over a portion of the top abrasive sheet in the stack to hold down the sheets more securely than the spacer alone would. The number, size, and location of the feet can be chosen to provide the desired degree of hold-down, while not interfering with the centering feature of the holder, and without unduly interfering with the engagement between the fastener 84 on the back of the abrasive sheet and the support surface of the backup pad. For example, the feet may extend further towards the center of the abrasive sheet. While the feet 51 are preferred for use with thinner spacers, the feet may also be used with thicker spacers. A dispenser may be provided with a single spacer sized for the particular backup pad and abrasive sheet. Alternatively, the dispenser may be provided with any number of interchangeable spacers to allow the dispenser to be used with different sized backup pads. The spacer may be replaced by removing screws 56 from the spacer, removing the spacer, and installing a second spacer with the screws 56.

The present invention has now been described with reference to several embodiments thereof. The foregoing detailed description has been given for clarity of understanding only. No unnecessary limitations are to be understood therefrom. It will be apparent to those skilled in the art that many changes can be made in the embodiments described without departing from the scope of the invention. For example, although the dispenser was described with respect to use with circular backup pads and abrasive sheets, it is understood that the dispenser could be used with backup pads and abrasive sheets of any shape, such as triangle, square, or other polygons. Thus, the scope of the present invention should not be limited to the exact details and structures described herein, but rather by the structures described by the language of the claims, and the equivalents of those structures.

What is claimed is:

1. A method of attaching an abrasive sheet to a support surface of a backup pad, wherein the abrasive sheet is larger than said support surface, and wherein the abrasive sheet includes an attachment surface for attachment to the support surface, comprising the steps of:

a) providing the abrasive sheet in a holder of a dispenser such that the attachment surface of the abrasive sheet is exposed, the holder being sized and configured to closely conform to a periphery of the abrasive sheet, wherein the dispenser also includes a spacer within the holder, wherein the spacer is sized and configured to closely conform to a periphery of the backup pad;

b) contacting the periphery of the backup pad against the spacer to thereby orient the backup pad relative to the abrasive sheet such that the periphery of the abrasive sheet extends beyond a periphery of the support surface of the backup pad;

c) while the backup pad is so oriented, contacting the backup pad against the attachment surface of the abrasive sheet so as to attach the abrasive sheet to the backup pad; and d) removing the backup pad and attached abrasive sheet from the holder.

2. The method of claim 1, wherein the backup pad and abrasive sheet are circular, and wherein step b) further comprises orienting the support surface of the backup pad such that it is concentric with the abrasive sheet.

3. The method of claim 1, wherein step a) further comprises placing a plurality of abrasive sheets into the holder and moving the spacer to contact a top abrasive sheet.

4. The method of claim 3, comprising the further step subsequent to step d) of e) moving the spacer towards the plurality of abrasive sheets so as to contact a next adjacent abrasive sheet.

* * * * *